United States Patent
Mizuno et al.

(10) Patent No.: US 10,770,707 B2
(45) Date of Patent: *Sep. 8, 2020

(54) BATTERY SEPARATOR AND METHOD OF MANUFACTURING SAME

(71) Applicant: Toray Industries, Inc., Tokyo (JP)

(72) Inventors: Naoki Mizuno, Nasushiobara (JP); Masami Sugata, Nasushiobara (JP)

(73) Assignee: Toray Industries, Inc., Tokyo (JP)

(*) Notice: Subject to any disclaimer, the term of this patent is extended or adjusted under 35 U.S.C. 154(b) by 153 days.

This patent is subject to a terminal disclaimer.

(21) Appl. No.: 15/781,429

(22) PCT Filed: Nov. 14, 2016

(86) PCT No.: PCT/JP2016/083727
§ 371 (c)(1),
(2) Date: Jun. 4, 2018

(87) PCT Pub. No.: WO2017/094486
PCT Pub. Date: Jun. 8, 2017

(65) Prior Publication Data
US 2018/0366709 A1    Dec. 20, 2018

(30) Foreign Application Priority Data
Dec. 4, 2015    (JP) .................... 2015-237872

(51) Int. Cl.
*H01M 2/16*    (2006.01)
*B32B 5/32*    (2006.01)
(Continued)

(52) U.S. Cl.
CPC ......... *H01M 2/1686* (2013.01); *B29C 55/005* (2013.01); *B29C 55/143* (2013.01);
(Continued)

(58) Field of Classification Search
CPC .. H01M 2/1686; H01M 2/1653; H01M 2/166; B01D 2325/00; B01D 71/38; B01D 69/12; B01D 69/02; B01D 71/40
See application file for complete search history.

(56) References Cited

U.S. PATENT DOCUMENTS 9,680,142 B2    6/2017 Sano et al.
10,486,112 B2 *    11/2019 Mizuno .................. B01D 71/40
(Continued)

FOREIGN PATENT DOCUMENTS

CN    102473887 A    5/2012
CN    102642365 A    8/2012
(Continued)

OTHER PUBLICATIONS

Korean Office Action dated Aug. 28, 2019, of counterpart Korean Application No. 10-2018-7015290, along with and English translation.
(Continued)

*Primary Examiner* — Jeremiah R Smith
(74) *Attorney, Agent, or Firm* — DLA Piper LLP (US)

(57) ABSTRACT

A battery separator includes a polyolefin microporous membrane having a width of 100 mm or more, and a porous layer laminated on at least one surface of the polyolefin microporous membrane. The polyolefin microporous membrane has a variation range of an F25 value in a width direction of 1 MPa or less, and the F25 value indicates a value obtained by dividing a load value measured at 25% elongation of a specimen with use of a tensile tester by a cross-sectional area of the specimen. The porous layer contains a fluorine-based resin and an inorganic particle.

16 Claims, 3 Drawing Sheets

Longitudinal Stretching Device A

(51) Int. Cl.
| | |
|---|---|
| *C08J 9/28* | (2006.01) |
| *B29C 55/00* | (2006.01) |
| *B29C 55/14* | (2006.01) |
| *C08J 9/36* | (2006.01) |
| *B29D 7/01* | (2006.01) |
| *C08J 5/18* | (2006.01) |
| *C08J 7/04* | (2020.01) |
| *H01M 2/14* | (2006.01) |
| *H01M 10/0525* | (2010.01) |
| *B29K 27/00* | (2006.01) |
| *B29K 503/04* | (2006.01) |
| *B29L 31/34* | (2006.01) |
| *B29K 105/04* | (2006.01) |
| *B01D 69/02* | (2006.01) |
| *B01D 69/12* | (2006.01) |
| *B01D 71/38* | (2006.01) |
| *B01D 71/40* | (2006.01) |

(52) U.S. Cl.
CPC .............. *B29D 7/01* (2013.01); *B32B 5/32* (2013.01); *C08J 5/18* (2013.01); *C08J 7/0427* (2020.01); *C08J 9/28* (2013.01); *C08J 9/365* (2013.01); *H01M 2/145* (2013.01); *H01M 2/166* (2013.01); *H01M 2/1653* (2013.01); *H01M 10/0525* (2013.01); *B01D 69/02* (2013.01); *B01D 69/12* (2013.01); *B01D 71/38* (2013.01); *B01D 71/40* (2013.01); *B01D 2325/00* (2013.01); *B29K 2027/16* (2013.01); *B29K 2105/041* (2013.01); *B29K 2503/04* (2013.01); *B29L 2031/3468* (2013.01); *C08J 2201/03* (2013.01); *C08J 2201/0502* (2013.01); *C08J 2201/0543* (2013.01); *C08J 2205/02* (2013.01); *C08J 2323/06* (2013.01); *C08J 2427/16* (2013.01); *C08J 2427/20* (2013.01)

(56) References Cited

U.S. PATENT DOCUMENTS

| | | | |
|---|---|---|---|
| 2003/0003363 A1 | 1/2003 | Daido et al. | |
| 2009/0250838 A1* | 10/2009 | Sano | B29C 55/005 264/291 |
| 2010/0285348 A1 | 11/2010 | Murata et al. | |
| 2012/0015229 A1* | 1/2012 | Ohashi | B32B 27/08 429/144 |
| 2012/0115008 A1 | 5/2012 | Sano et al. | |
| 2013/0095365 A1 | 4/2013 | Nishikawa | |
| 2013/0116355 A1* | 5/2013 | Kang | C08L 23/06 521/143 |
| 2014/0349193 A1 | 11/2014 | Kang et al. | |
| 2014/0361457 A1* | 12/2014 | Nogata | B01D 67/0027 264/210.4 |
| 2015/0202647 A1 | 7/2015 | Watanabe et al. | |
| 2016/0126520 A1* | 5/2016 | Mizuno | H01M 2/1653 429/145 |
| 2016/0164060 A1* | 6/2016 | Zhang | H01M 2/1613 429/145 |
| 2016/0276642 A1* | 9/2016 | Mizuno | H01M 2/145 |
| 2016/0336569 A1* | 11/2016 | Mizuno | B29C 48/914 |
| 2017/0165893 A1* | 6/2017 | Ichinomiya | B01D 67/0027 |
| 2017/0274329 A1 | 9/2017 | Mizuno et al. | |
| 2017/0317328 A1* | 11/2017 | Mizuno | B32B 5/32 |

FOREIGN PATENT DOCUMENTS

| | | |
|---|---|---|
| CN | 107851766 A | 3/2018 |
| JP | 2009-249480 A | 10/2009 |
| JP | 2012-500130 A | 1/2012 |
| JP | 4988973 B1 | 8/2012 |
| JP | 2013-142101 A | 7/2013 |
| JP | 2013-530261 A | 7/2013 |
| JP | 5226744 B2 | 7/2013 |
| JP | 2015-182420 A | 10/2015 |
| JP | 2016-143640 A | 8/2016 |
| KR | 10-2012-0121152 A | 11/2012 |
| KR | 10-1336593 B1 | 12/2013 |
| WO | 2010/018749 A1 | 2/2010 |
| WO | 2013/080701 A1 | 6/2013 |
| WO | 2014/025004 A1 | 2/2014 |
| WO | 2016/080200 A1 | 5/2016 |
| WO | 2016/092993 A1 | 6/2016 |

OTHER PUBLICATIONS

The First Office Action dated Apr. 21, 2020, of counterpart Chinese Application No. 201680070368.2, along with an English translation.

* cited by examiner

Longitudinal Stretching Device A

Longitudinal Stretching Device B

Longitudinal Stretching Device C

Example of Re-Stretching Device

Example of Coating Device

BATTERY SEPARATOR AND METHOD OF MANUFACTURING SAME

TECHNICAL FIELD

This disclosure is directed to a battery separator including a porous layer having electrode adhesion and a polyolefin-based porous membrane, which is a battery separator capable of achieving a high winding density when formed into a roll and suitable for a lithium ion secondary battery having a high volume energy density.

BACKGROUND

A thermoplastic resin microporous membrane is widely used as a membrane for separation of substances, a membrane for selective permeation of substances, a membrane for isolation of substances and the like. Examples thereof include, for example, a battery separator to be used in lithium ion secondary battery, nickel-hydrogen battery, nickel-cadmium battery or polymer battery; a separator for electric double layer capacitors; various filters such as reverse osmosis filtration membrane, ultrafiltration membrane and microfiltration membrane; a moisture-permeable waterproof clothing; a medical material and the like.

In particular, a polyethylene-made microporous membrane is suitably used as a lithium ion secondary battery separator, the polyethylene-made microporous membrane ensuring ion permeability due to impregnation with an electrolytic solution, excellent electrical insulating properties, and a pore blocking function of avoiding an excessive temperature rise by cutting off a current at a temperature of approximately 120 to 150° C. when the temperature in a battery shows an abnormal rise. However, if the temperature rise in the battery continues for some reasons even after pore blocking, the polyethylene-made microporous membrane may shrink and rupture. This phenomenon is not limited to the polyethylene-made microporous membrane, but even in a microporous membrane using other thermoplastic resins, the phenomenon above cannot be avoided at a temperature not less than the melting point of the resin.

In particular, a lithium ion battery separator is deeply related to battery characteristics, battery productivity and battery safety and is required to be excellent in mechanical properties, electrode adhesion, ion permeability, dimension stability, pore-blocking property (shutdown property), melt rupture property (meltdown property) and the like.

Furthermore, in a wound battery, to enhance the volume energy density, it is desirable that an electrode body having a lamination of a negative electrode, a separator and a positive electrode can be packed in a container at a high density. Consequently, the separator will also be constrained by an increasing requirement not only for thickness reduction, but also for high-density winding.

In Example 1 of Japanese Patent No. 4988973, both surfaces of a polyethylene microporous membrane are coated with a coating solution prepared by dissolving a polyvinylidene fluoride-hexafluoropropylene copolymer in a mixed solvent of dimethylacetamide/tripropylene glycol, followed by putting in a coagulation bath, and subjecting to water washing and drying, thereby obtaining a non-aqueous secondary battery separator.

In Example 1 of Japanese Patent No. 5226744, a coating solution prepared by dissolving VdF/HFP/CTFE in a mixed solvent of DMAc/TPG is put in a tank in which two Mayer bars have been arranged in parallel at the bottom thereof, and a polypropylene microporous membrane is transported from the upper part of the tank into the tank at a transport rate of 3 m/min to pass through the two Mayer bars to coat the both surfaces with a fluorine-based solution, followed by putting it in a coagulation tank, and subjecting to water washing and drying, thereby obtaining a composite porous membrane.

In recent years, studies are being made on the use of a lithium ion secondary battery over a wide range including a large-sized tablet, a lawn mower, an electric bicycle, an electric vehicle, a hybrid vehicle, a small boat and the like. To this end, a large battery compared with conventional batteries used in a small electronic device such as portable phone or portable information device is required. Consequently, a separator incorporated into a battery is required to have the increased width.

On the other hand, in a separator obtained by arranging a porous layer on a microporous membrane, an increase in the width of the microporous membrane makes it difficult to arrange a porous layer with a uniform thickness in the width direction by coating. In particular, when a Mayer bar is used, deflection occurs in the Mayer bar itself as the coating width increases and, thus, uniform coating is difficult.

Non-uniform thickness of a porous layer means that a thin portion is partially found in the porous layer, and the average thickness of the porous layer is required to be a thickness as large as 1.5 to 2 times the minimum necessary thickness for sufficiently ensuring the function of the porous layer. This becomes a factor for increased cost due to increase in the resin amount. Furthermore, in an electrode body where a positive electrode and a negative electrode are laminated or wound via a separator, the increase in thickness of the separator decreases the number of laminations or windings in the electrode body, giving rise to a hindrance to a high capacity of a battery.

The non-uniform thickness of the porous layer also adversely affects the winding appearance of the separator roll, for example, by generating a streaky dent or a convex streak in the separator roll or by producing wavy wrinkles at the edge of the roll. In the future, it is predicted that the length of the separator increases to reduce replacing loss of materials in the production process of an electrode body and since an increase in the length involves an increase in the number of turns in a separator roll, the roll diameter becomes large. In turn, the problem with the winding appearance becomes more pronounced.

Under conventional coating techniques, a porous layer having a uniform thickness in the width direction can hardly be arranged on a wide microporous membrane, and the separator roll cannot be sufficiently satisfied in terms of winding appearance, leading to a decrease in the yield.

It could therefore be helpful to provide a battery separator capable of being wound at a high density and suitable for achieving a high battery capacity, wherein a porous layer having a uniform thickness and improving electrode adhesion is laminated on at least one surface of a polyolefin microporous membrane having a width of 100 mm or more and a variation range of an F25 value in the width direction of 1 MPa or less.

SUMMARY

We thus provide:

(1) A battery separator comprising a polyolefin microporous membrane having a width of 100 mm or more, and a porous layer laminated on at least one surface of the polyolefin microporous membrane, wherein the polyolefin microporous membrane has a variation range of an F25 value in a width direction of 1 MPa or less (wherein the F25 value indicates a value obtained by dividing a load value measured at 25% elongation of a specimen with use of a tensile tester by a cross-sectional area of the specimen), and the porous layer contains a fluorine-based resin and an inorganic particle.

(2) It is preferred that the porous layer has a thickness variation range (R) in a width direction of 1.0 μm or less.

(3) It is preferred that the fluorine-based resin contains at least one member selected from a polyvinylidene fluoride and a polyvinylidene fluoride-hexafluoropropylene copolymer.

(4) It is preferred that a width of the battery separator is 500 mm or more.

(5) It is preferred that a length of the battery separator is 500 m or more.

(6) A method of producing the battery separator according to any one of the above (1) to (5), the method comprising the following steps (a) to (g) in the following order:

(a) a step of melt-kneading a polyolefin resin and a forming solvent, thereby preparing a polyolefin resin solution;

(b) a step of extruding the polyolefin resin solution into a sheet shape via an extruder and cooling an extrudate thereof, thereby forming an unstretched gel-like sheet;

(c) a step of passing the unstretched gel-like sheet between at least two pairs of longitudinal stretching roller groups and stretching it in a longitudinal direction based on a peripheral speed ratio of the two pairs of roller groups, thereby forming a longitudinally stretched gel-like sheet (wherein a longitudinal stretching roller and a nip roller parallelly contacting therewith are designated as a pair of longitudinal stretching roller group, and a contact pressure of the nip roller to the longitudinal stretching roller is 0.05 MPa or more and 0.5 MPa or less);

(d) a step of stretching the longitudinally stretched gel-like sheet in a transverse direction while holding it to allow a clip-to-clip distance to be 50 mm or less at a tenter outlet, thereby obtaining a biaxially stretched gel-like sheet;

(e) a step of extracting the forming solvent from the biaxially stretched gel-like sheet and drying it;

(f) a step of heat-treating the dried sheet, thereby obtaining a polyolefin microporous membrane; and (g) a step of coating the polyolefin microporous membrane with a coating solution containing a fluorine-based resin and an inorganic particle by a reverse gravure coating method, passing it through a coagulation bath, and then, subjecting to water washing and drying, thereby laminating a porous layer on the polyolefin microporous membrane.

(7) It is preferred that the coating solution has a solution viscosity of 50 to 200 mPa·s.

The uniform thickness of the porous layer means that the porous layer has a thickness variation range (R) in a width direction of 1.0 μm or less.

A battery separator capable of being wound at a high density and suitable for achieving a high battery capacity while maintaining excellent electrode adhesion, in which a porous layer having a uniform thickness and containing a fluorine-based resin and an inorganic particle is laminated on at least one surface of a polyolefin microporous membrane having a width of 100 mm or more and a variation range of an F25 value in the width direction of 1 MPa or less, is obtained.

DESCRIPTION OF REFERENCE NUMERALS AND SIGNS

Figure 1:
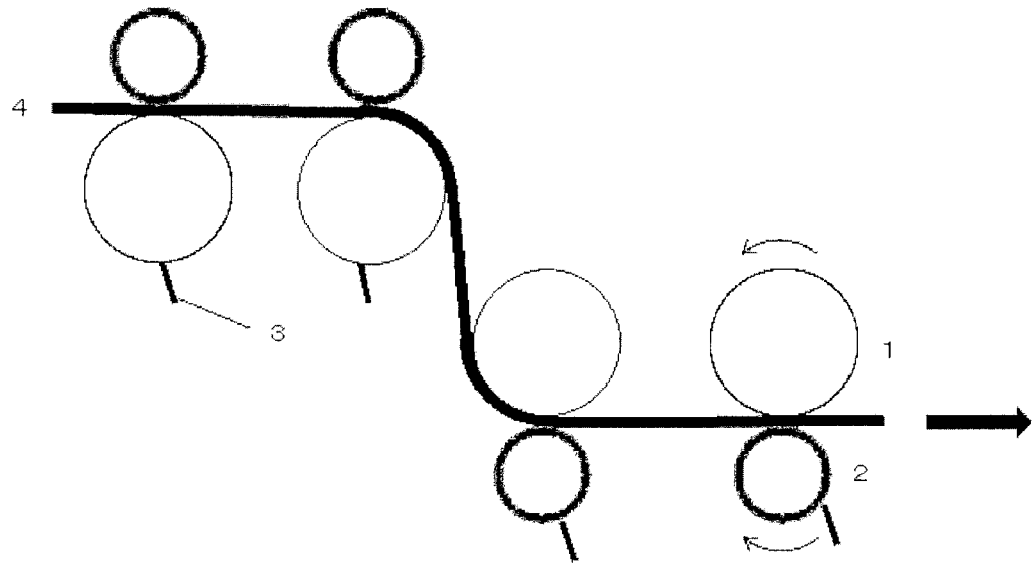
FIG. 1 is a schematic diagram illustrating a longitudinal stretching device A used for sequential biaxial stretching.

1. Longitudinal stretching roller
2. Nip roller
3. Blade
4. Unstretched gel-like sheet
5. Biaxially stretched sheet
6. Longitudinal re-stretching roller
7. Nip roller for longitudinal re-stretching
8. Polyolefin microporous membrane
9. Gravure roller
10. Coating contact line
11. Backing roller
12. Direction of roller position adjustment

DETAILED DESCRIPTION

In the polyolefin microporous membrane, the width is 100 mm or more, and the variation range of the F25 value in the width direction is 1 MPa or less (here, the F25 value indicates a value obtained by dividing a load value measured at 25% elongation of a specimen with use of a tensile tester by a cross-sectional area of the specimen).

By using a polyolefin microporous membrane having a small tensile stress variation in the width direction, which is the variation range of the F25 value in the width direction of 1 MPa or less, the following excellent effects are achieved: the contact pressure at a contact line of the polyolefin microporous membrane and the coating roller (hereinafter, simply referred to as "coating contact line") is likely to be uniform relative to the width direction of the polyolefin microporous membrane and the coating thickness can be easily made uniform. If the variation range of the F25 value exceeds 1 MPa, the polyolefin microporous membrane may meander during transport in a slitting step or coating step to deteriorate the winding appearance of the roll, and this may be prominently found, for example, in processing at such a high speed as providing a transport rate of 50 m/min or more during winding onto a winding core.

1. Polyolefin Microporous Membrane

First, the polyolefin porous membrane is described.

In the polyolefin microporous membrane, the variation range of the F25 value in the width direction is 1 MPa or less, preferably 0.8 MPa or less, more preferably 0.6 MPa or less, and most preferably 0.4 MPa or less. As described below, the variation range of the F25 value in the width direction of the polyolefin microporous membrane can be adjusted in particular by highly controlling the longitudinal stretching step and the transverse stretching step.

The polyolefin resin constituting the polyolefin microporous membrane contains a polyethylene resin as the main component. The content of the polyethylene resin is preferably 70 mass % or more, more preferably 90 mass % or more, still more preferably 100 mass %, per 100 mass % of the total mass of the polyolefin resin.

Examples of the polyolefin resin include, for example, a homopolymer, a two-step polymer, a copolymer, which are obtained by (co)polymerizing ethylene, propylene, 1-butene, 4-methyl 1-pentene, 1-hexene, and a mixture thereof. The resin may be a single resin or a mixture of two or more different polyolefin resins, for example, a mixture of polyethylene and polypropylene or a copolymer of different olefins. In particular, a polyethylene is preferable in view of pore blocking performance, and the melting point (softening point) of the polyethylene is preferably 70 to 150° C.

Examples of the polyethylene include a ultrahigh-molecular-weight polyethylene, a high-density polyethylene, a medium-density polyethylene, a low-density polyethylene and the like. The polymerization catalyst is not particularly limited, and a Ziegler-Natta catalyst, a Phillips catalyst, a metallocene catalyst or the like may be used. Such a polyethylene may not only be a homopolymer of ethylene but also be a copolymer containing a small amount of other $\alpha$-olefin. As the $\alpha$-olefin other than ethylene, suitable examples thereof include propylene, 1-butene, 1-pentene, 1-hexene, 4-methyl-1-pentene, 1-octene, (meth)acrylic acid, (meth)acrylic acid ester, styrene and the like. The polyethylene may be a single polyethylene, but is preferably a polyethylene mixture composed of two or more polyethylenes.

As the polyethylene mixture, a mixture of two or more kinds of ultrahigh-molecular-weight polyethylenes differing in the weight average molecular weight (Mw), a mixture of two or more kinds of high-density polyethylenes differing in the weight average molecular weight (Mw), a mixture of two or more kinds of medium-density polyethylenes differing in the weight average molecular weight (Mw), or a mixture of two or more kinds of low-density polyethylenes differing in the weight average molecular weight (Mw) may be used, or a mixture of two or more kinds of polyethylenes selected from the group consisting of an ultrahigh-molecular-weight polyethylene, a high-density polyethylene, a medium-density polyethylene and a low-density polyethylene may be used. The polyethylene mixture is preferably a mixture of an ultrahigh-molecular-weight polyethylene having an Mw of $5 \times 10^5$ or more and a polyethylene having an Mw of $1 \times 10^4$ or more and less than $5 \times 10^5$. The content of the ultrahigh-molecular-weight polyethylene in the mixture is preferably 1 to 40 wt % in view of tensile strength. The molecular weight distribution (weight average molecular weight (Mw)/number average molecular weight (Mn)) of the polyethylene is preferably 5 to 200 in view of mechanical strength.

2. Production Method of Polyolefin Microporous Membrane

Next, the method of producing the porous microporous membrane is described.

As the method of producing the polyolefin microporous membrane, examples thereof include a dry process (a method of forming micropores by not using a forming solvent but using a crystal nucleating agent or a particle (also called a stretching pore-opening method) and a wet process (phase separation method), and in view of homogenization of micropores and planarity, the wet process is preferred.

Examples of the production method by a wet process include, for example, a method where a polyolefin and a forming solvent are heated and melt-kneaded, the obtained resin solution is extruded through a die and cooled to form an unstretched gel-like sheet, and the resulting unstretched gel-like sheet is stretched in at least one axis direction and after removing the forming solvent, the stretched sheet is dried to obtain a microporous membrane.

The polyolefin microporous membrane may be a single-layer membrane or may be a multilayer membrane including two or more layers differing in the molecular weight or average pore size of the polyolefin. In the multilayer membrane, the molecular weight and molecular weight distribution of the polyethylene resin in at least one outermost layer preferably satisfy the ranges above.

As the method of producing a multilayer polyolefin microporous membrane including two or more layers, the membrane can be manufactured either by a method where each of the polyolefin resins constituting layer a and layer b and a forming solvent are heated and melt-kneaded and the obtained resin solutions are supplied to one die from respective extruders, combined and co-extruded, or a method where respective layers are laminated and thermally fusion-bonded. A co-extrusion method is preferred because an interlayer adhesion strength is easily obtained, a communication hole is easy to be formed between layers, making it easy to maintain high permeability, and moreover, the productivity is excellent.

The production method of obtaining the polyolefin microporous membrane is described in detail below.

The unstretched gel-like sheet is stretched in two directions, i.e., machine direction (also referred to as "MD" or "longitudinal direction") and width direction (also referred to as "TD" or "transverse direction"), at a predetermined stretch ratio by a roller method, a tenter method or a combination of these methods. A sequential biaxial stretching method of performing stretching sequentially in the longitudinal direction and in the transverse direction is preferred. A simultaneous biaxial stretching method is a stretching method of fixing both ends of the unstretched gel-like sheet with clips and expanding the clips apart from each other simultaneously in the longitudinal direction and in the transverse direction. In such a simultaneous biaxial stretching method, the clip-to-clip distance increases in association with the stretch ratio and, as a result, the variation range of the F25 value in the width direction is likely to increase, which is disadvantageous.

(a) Preparation Step of Polyolefin Resin Solution

First, a forming solvent is added to a polyolefin resin, and the mixture is then melt-kneaded to prepare a polyolefin resin solution. As the melt-kneading method, a method using a twin-screw extruder described, for example, in JP-B-H06-104736 and Japanese Patent No. 3347835 can be used. Since the melt-kneading method is publicly known, description thereof is omitted.

The forming solvent is not particularly limited as long as it can dissolve the polyethylene sufficiently. Examples thereof include an aliphatic or cyclic hydrocarbon such as nonane, decane, undecane, dodecane and liquid paraffin, and a mineral oil fraction of which boiling point corresponds to the hydrocarbon above, and a non-volatile solvent such as liquid paraffin is preferred.

The polyolefin resin concentration in the polyolefin resin solution is preferably 25 to 40 parts by weight per 100 parts by weight of a total of the polyolefin resin and the forming solvent. When the polyolefin resin concentration falls within the preferable range above, swelling or neck-in at the die outlet can be prevented during the extrusion of the polyolefin resin solution, and the formability and self-supporting property of the gel-like sheet are maintained.

(b) Step of Forming Unstretched Gel-Like Sheet

Subsequently, the polyolefin resin solution is fed to a die from the extruder directly or via another extruder, extruded in a sheet shape, and cooled to form an unstretched gel-like sheet. A plurality of polyolefin solutions having the same or different compositions may also be fed to one die from the extruder, laminated in layers there and extruded in a sheet shape.

The extrusion method may be either a flat die method or an inflation method. The extrusion temperature is preferably 140 to 250° C., and the extrusion rate is preferably 0.2 to 15 m/min. The thickness can be adjusted by adjusting the extrusion amount of each of the polyolefin solutions. As for the extrusion method, a method disclosed, for example, in JP-B-H06-104736 and Japanese Patent No. 3347835 can be utilized.

A gel-like sheet is formed by cooling the polyolefin resin solution extruded in a sheet shape. As the cooling method, for example, a method of bringing the extrudate into contact with a cooling medium such as cold air and cooling water, or a method of bringing the extrudate into contact with a cooling roller can be used, and it is preferable to cool the extrudate by bringing it into contact with a roller cooled by a cooling medium. For example, the polyolefin resin solution extruded in a sheet shape is brought into contact with a rotating cooling roller set at a surface temperature of 20 to 40° C. by a cooling medium, and an unstretched gel-like sheet can thereby be formed. The extruded polyolefin resin solution is preferably cooled to 25° C. or less.

(c) Longitudinal Stretching Step

The unstretched gel-like sheet is passed through a plurality of preheat rollers to raise the temperature to a predetermined temperature, then passed between at least two pairs of longitudinal stretching roller groups setting a peripheral speed ratio, and thereby stretched in the longitudinal direction to form a longitudinally stretched gel-like sheet.

It is important in terms of adjusting the variation range of the F25 value in the width direction to avoid sheet slip during longitudinal stretching and achieve uniform longitudinal stretching. When a longitudinal stretching roller and a nip roller parallelly contacting with the longitudinal stretching roller under a constant pressure are designated as a pair of longitudinal stretching roller group, the sheet is brought into close contact with the longitudinal stretching rollers and the position for stretching the sheet is fixed, thereby making it possible to achieve stable sheet travel and uniform longitudinal stretching. Only increasing the contact area of the longitudinal stretching roller and the gel-like sheet without using a nip roller may not produce a sufficient effect of avoiding slip and may increase the variation range of the F25 value. In addition, to achieve uniform longitudinal stretching, a desired stretching ratio is preferably realized in the longitudinal stretching step by dividing the stretching into two or more stages rather than by performing single-stage stretching. That is, it is preferable to arrange three or more longitudinal stretching rollers.

The temperature in the longitudinal stretching step is not more than "melting point of polyolefin resin+10° C.". Furthermore, in view of elasticity and strength of the polyolefin microporous membrane, the stretch ratio based on areal stretch ratio is preferably 9 times or more, more preferably 16 to 400 times.

As for the surface temperature of the longitudinal stretching roller, it is important to control the surface temperature to be uniform in the effective width of the stretching roller (the width through which the sheet under stretching passes). The "surface temperature of the longitudinal stretching roller being uniform" indicates that the variation range of the surface temperature in the measurement of temperature at 5 points in the width direction is within ±2° C. The surface temperature of the longitudinal stretching roller can be measured, for example, by an infrared radiation thermometer.

The longitudinal stretching roller is preferably a metal roller having a surface roughness of 0.3 S to 5.0 S and having been subjected to hard chromium plating. When the surface roughness falls within this range, good thermal conductance is achieved, and due to synergy with the nip roller, sheet slip can be effectively avoided.

In the longitudinal stretching step, when it is intended to avoid sheet slip only by the use of one nip roller, the pressure on the nip roller in contact with the stretching roller (sometimes referred to as "nip pressure") must be increased and may cause collapse of micropores in the obtained polyolefin microporous membrane. It is preferable to make the nip pressure on the longitudinal stretching roller paired with each nip roller relatively small by using a plurality of nip rollers. The nip pressure of each nip roller is 0.05 MPa or more and 0.5 MPa or less. If the nip pressure of the nip roller exceeds 0.5 MPa, micropores in the obtained polyolefin microporous membrane may collapse. If the nip pressure is less than 0.05 MPa, due to an insufficient nip pressure, the effect of avoiding the slip is not obtained and in addition, an effect of squeezing the forming solvent is also less likely to be obtained. The "squeezing effect" indicates that by squeezing out the forming solvent from the unstretched gel-like sheet or the gel-like sheet under longitudinal stretching, slip against the longitudinal stretching roller can be avoided and stretching can be stably performed. The lower limit of the nip pressure of the nip roller is preferably 0.1 MPa, more preferably 0.2 MPa, and the upper limit is preferably 0.5 MPa, more preferably 0.4 MPa. When the nip pressure of the nip roller falls within the range above, an appropriate effect of avoiding the slip is obtained.

In addition, the nip roller needs to be covered with a heat-resistant rubber. During the longitudinal stretching step, the forming solvent may bleed out from the gel-like sheet due to heat or pressure by tension, and in particular, the bleeding out is prominently found in the longitudinal stretching immediately after extrusion. Consequently, the sheet is transported or stretched while allowing the bled-out forming solvent to be present at the interface between the sheet and the roller surface, and the sheet is put in a slippery state. When a nip roller covered with a heat-resistant rubber is arranged to parallelly come into contact with the longitudinal stretching roller and the unstretched gel-like sheet is passed therethrough, stretching can be performed while squeezing out the forming solvent from the gel-like sheet under stretching, and slip is thereby avoided, and as a result, a stabilized variation range of F25 value is obtained.

In the longitudinal stretching step, when a method of removing the forming solvent attached to the longitudinal stretching roller and the nip roller (sometimes referred to as "scraping means") is used in combination, the effect of avoiding the slip is more efficiently obtained. The scraping means is not particularly limited, but a doctor blade, blowing with the compressed air, suction, or a combination thereof may be used. In particular, the method of scraping off the forming solvent by a doctor blade is relatively easily conducted and, therefore, the method is preferred. A method where a doctor blade is abutted on the longitudinal stretching roller to run in parallel to the width direction of the longitudinal stretching roller and the forming solvent is scraped off to the extent that the forming solvent cannot be visually recognized on the stretching roller surface in the period from immediately after passing through the doctor blade until contact by the gel-like sheet under stretching, is preferred. As to the doctor blade, one sheet may be used, or a plurality of sheets may be used. The scraping means may be disposed on either the longitudinal stretching roller or the nip roller or may be disposed on both.

The material of the doctor blade is not particularly limited as long as the material has resistance to a forming solvent, and a resin-made or rubber-made doctor blade is more preferred than a metal-made doctor blade. In a metal-made doctor blade, the stretching roller may be damaged. Examples of the resin-made doctor blade include a polyester-made doctor blade, a polyacetal-made doctor blade, a polyethylene-made doctor blade and the like.

(d) Transverse Stretching Step

After fixing both ends of the obtained longitudinally stretched gel-like sheet by clips, the clips are expanded apart from each other in the transverse direction in the tenter to obtain a biaxially stretched gel-like sheet. The clip-to-clip distance in the sheet traveling direction is preferably maintained, from inlet to outlet of the tenter, at 50 mm or less, more preferably 25 mm or less, still more preferably 10 mm or less. When the clip-to-clip distance falls within the preferable range above, the variation range of the F25 value in the width direction can be reduced.

In the transverse stretching step or heat treatment step, to reduce the effect of abrupt temperature change, it is preferable to divide the inside of the tenter into 10 to 30 zones and control the temperature of each zone independently. In particular, in the zone set at a highest temperature of the heat treatment step, to not cause an abrupt temperature change between respective zones in the heat treatment step, the temperature of each zone is preferably raised with hot air in a stepwise manner in the sheet traveling direction. Furthermore, it is important to control generation of a temperature spot in the width direction of the tenter. As the control means to avoid generation of a temperature spot, the wind speed variation range in the width direction of hot air is preferably kept at 3 m/sec or less, more preferably 2 m/sec or less, still more preferably 1 m/sec or less. When the wind speed variation range of hot air is kept at 3 m/sec or less, the variation range of the F25 value in the width direction of the polyolefin microporous membrane can be reduced.

The wind speed means the wind speed on the surface of the gel-like sheet under transverse stretching, facing the outlet of the hot air blowing nozzle, and can be measured by a thermal anemometer, for example, Anemomaster Model 6161 manufactured by KANOMAX Japan Inc.

(e) Step of Removing Forming Solvent from Biaxially Stretched Gel-Like Sheet and Drying the Sheet The forming solvent is removed (washed) from the biaxially stretched gel-like sheet by using a washing solvent. As the washing solvent, a highly volatile solvent may be used and examples thereof include, for example, a hydrocarbon such as pentane, hexane and heptane, a chlorinated hydrocarbon such as methylene chloride and carbon tetrachloride, a fluorocarbon such as trifluoroethane, and ethers such as diethyl ether and dioxane. These washing solvents are appropriately selected depending on the forming solvent and are used individually or as a mixture. As for the washing method, examples thereof include a method of performing extraction by immersion in the washing solvent, a method of showering the washing solvent, a method of suctioning the washing solvent from the opposite side of the sheet, or a combination of these methods. The washing above is performed until the residual solvent content in the sheet becomes less than 1 wt %. The sheet is then dried, and as for the drying method, the drying may be performed by heat-drying, air-drying or the like.

(f) Step of Heat-Treating Dried Sheet to Obtain Polyolefin Microporous Membrane

The sheet after drying is heat-treated to obtain a polyolefin microporous membrane. The heat treatment is preferably performed at a temperature of 90 to 150° C. in view of thermal shrinkage and air permeation resistance. The residence time in the heat treatment step is not particularly limited and is usually 1 second or more and 10 minutes or less, preferably 3 seconds or more and 2 minutes or less. For the heat treatment, any of a tenter method, a roller method, a rolling method, and a free method can be employed.

In the heat treatment step, the sheet is preferably shrunk in at least one direction of the longitudinal direction and the transverse direction while fixing both the longitudinal direction and the transverse direction. The residual strain in the polyolefin microporous membrane can be removed by the heat treatment step. In view of thermal shrinkage rate and air permeation resistance, the shrinkage rate in the longitudinal direction or the transverse direction in the heat treatment step is preferably 0.01 to 50%, more preferably 3 to 20%. Furthermore, re-heating and re-stretching may be performed to enhance the mechanical strength. The re-stretching may be either a stretching roller method or a tenter method. A functionalization step such as corona treatment step or hydrophilization step may be provided, if desired, after the steps (a) to (f).

As described above, when the longitudinal stretching and transverse stretching are highly adjusted, the variation range of the F25 value in the width direction of the polyolefin microporous membrane can be reduced. Consequently, not only the variation range of the coating thickness tends to be reduced in the later-described laminating step of a porous layer but also a battery separator roll with good winding appearance is obtained. Furthermore, the variation range of the F25 value is kept at 1 MPa or less so that even when the processing is performed at such a high speed as giving a transport rate of more than 50 m/min during winding by a rewinder, meandering in the course of transport in a slitting step or coating step can be avoided.

3. Porous Layer

The porous layer is described below.

The porous layer has a function of enhancing the electrode adhesion. The porous layer is constructed mainly from a fluorine-based resin and an inorganic particle. The fluorine-based resin has a role of enhancing the electrode adhesion and binding inorganic particles with each other, or a role of binding the polyolefin microporous membrane and the porous layer. As the fluorine-based resin, it is preferable to use one or more members selected from the group consisting of a vinylidene fluoride homopolymer, a vinylidene fluoride/fluorinated olefin copolymer, a vinyl fluoride homopolymer, and a vinyl fluoride/fluorinated olefin copolymer. The resin may also be a resin graft-polymerized with maleic acid or the like. Such a polymer has excellent adhesion to an electrode, high affinity for a nonaqueous electrolyte, and high chemical and physical stabilities to a nonaqueous electrolyte, and therefore, affinity for an electrolyte can be sufficiently maintained even when used at high temperature. Among them, a polyvinylidene fluoride-hexafluoropropylene copolymer is suitable in view of electrode adhesion.

The inorganic particle has a role of enhancing the heat resistance and imparting an effect of preventing short-circuit due to a dendrite originating from an electrode material. Examples of the inorganic particle include calcium carbonate, calcium phosphate, amorphous silica, crystalline glass filler, kaolin, talc, titanium dioxide, alumina, silica-alumina composite oxide particle, barium sulfate, calcium fluoride, lithium fluoride, zeolite, molybdenum sulfide, mica, boehmite and the like. In addition, a heat-resistant crosslinked polymer particle may be added, if desired. Examples of the heat-resistant crosslinked polymer particle include a crosslinked polystyrene particle, a crosslinked acrylic resin particle, a crosslinked methyl methacrylate-based particle and the like. Examples of the shape of the particle include a perfectly spherical shape, a substantially spherical shape, a plate shape, a needle shape, and a polyhedral shape but is not particularly limited.

The average particle diameter of the particle is preferably 1.5 times or more and 50 times or less, more preferably 2 times or more and 20 times or less, based on the average pore size of the polyolefin microporous membrane. When the average particle diameter of the particle falls within the preferable range above, in the state of the fluorine-based resin and the particle being mixed, the pore in the laminated polyolefin microporous membrane is prevented from blocking, and as a result, the air permeation resistance can be maintained. In addition, the particle is prevented from falling off in a battery assembly step and causing a serious defect of the battery.

As for the content of the inorganic particle contained in the porous layer, the upper limit is preferably 80 vol %, more preferably 75 vol %, and the lower limit is preferably 30 vol %, more preferably 40 vol %. When the amount of the particle added meets the preferable upper limit above, heat resistance and a dendrite preventing effect are obtained. In addition, when the amount added meets the preferable lower limit above, the ratio of a functional resin to the total volume of the porous layer becomes optimal and therefore, electrode adhesion is obtained.

4. Method of Laminating Porous Layer on Polyolefin Microporous Membrane

The method of laminating the porous layer on the polyolefin microporous membrane is described.

A predetermined polyolefin porous membrane is coated with a coating solution containing an inorganic particle, a fluorine-based resin, and a solvent capable of dissolving the fluorine-based resin and miscible with water, phase separation is allowed to occur between the fluorine-based resin and the solvent, followed by adding it to a coagulation bath to coagulate the resin, thereby forming the porous layer. In the coating solution, a phase separation aid such as water, ethylene glycol or propylene glycol may be added, if desired.

The viscosity of the coating solution is preferably 30 to 200 mPa·s, more preferably 40 to 180 mPa·s, still more preferably 50 to 150 mPa·s. When the viscosity of the coating solution falls within the preferable range above, the thickness of the porous layer can be easily made uniform, and the productivity is excellent. The viscosity of the coating solution may be adjusted by using the solid content concentration of the coating solution or a thickener or may be adjusted by blending a fluorine-based resin differing in the molecular weight.

The solid content concentration of the coating solution is not particularly limited as long as the coating solution can be uniformly applied, and it is preferably 3 wt % or more and 30 wt % or less, more preferably 5 wt % or more and 25 wt % or less. If the solid content concentration is less than 3 wt %, the obtained porous layer may become brittle, and if it exceeds 30 wt %, the productivity and coatability are reduced.

As the solvent that can be used to dissolve the fluorine-based resin, examples thereof include N,N-dimethylacetamide (DMAc), N-methyl-2-pyrrolidone (NMP), hexamethylphosphoric triamide (HMPA), N,N-dimethylformamide (DMF), dimethyl sulfoxide (DMSO), γ-butyrolactone, chloroform, tetrachloroethane, dichloroethane, 3-chloronaphthalene, parachlorophenol, tetralin, acetone, acetonitrile and the like, and the solvent can be freely selected depending on the solubility of the resin.

As to the method of coating the polyolefin microporous film, a known wet coating method can be used, but in view of productivity, a roll coating method, especially a gravure coating method is suitable in view of thickness uniformity of the porous layer. A polyolefin microporous membrane having the variation range of the F25 value in the width direction of 1 MPa or less is used, and this makes it easy to let the contact pressure at a contact line (coating contact line) with the coating roller be uniform and achieve a uniform coating thickness.

The coating method is described below by referring to a reverse gravure coating method as an example.

For the porous layer to have a uniform thickness, it is important that the width of the coating contact line between the gravure roller and the polyolefin microporous membrane is 3 mm or more and 10 mm or less in an effective coating width. When the width of the coating contact line falls within the range above, a uniform coating thickness is obtained in the width direction. If the width of the coating contact line exceeds 10 mm, the contact pressure between the polyolefin microporous membrane and the coating roller is large, and the coating surface is likely to be damaged. The effective coating width indicates a width after excluding 3 mm at both edges from the total coating width. For the reason that the coating solution may locally rise or bleed due to surface tension, 3 mm is excluded at both edges.

Figure 5:
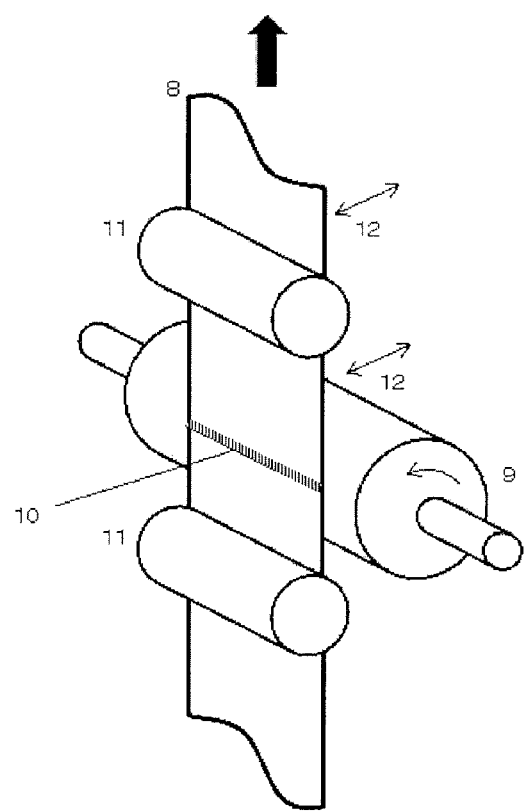
FIG. 5 is a schematic diagram illustrating an example of a coating device.

The coating contact line is a line along which the gravure roller contacts with the polyolefin microporous membrane, and the width of the coating contact line means the width of the coating contact line in the machine direction (see FIG. 5). The width of the coating contact line can be measured by observing the coating contact line between the gravure roller and the polyolefin microporous membrane from the back side of the polyolefin microporous membrane. The width of the coating contact line can be adjusted by adjusting the left/right position balance relative to the horizontal direction of the backing roller disposed at the back of the coating surface, in addition to positioning the gravure roller backward/forward relative to the polyolefin microporous membrane. It is more effective to dispose the backing roller on both the upstream and downstream sides of the coating roller.

In view of electrode adhesion, the average thickness T(ave) of the porous layer is preferably 1 to 5 μm, more preferably 1 to 4 μm, still more preferably 1 to 3 μm. The winding volume can be reduced, and a battery separator suitable for a lithium ion secondary battery with a high volume energy density is obtained.

The "thickness of the porous layer in the width direction of the separator being uniform" means that the thickness variation range (R) relative to the effective coating width is 1.0 μm or less. The thickness variation range (R) is preferably 0.8 μm or less, more preferably 0.5 μm or less.

The porosity of the porous layer is preferably 30 to 90%, more preferably 40 to 70%. The desired porosity is achieved by appropriately adjusting the inorganic particle concentration, binder concentration or the like.

5. Battery Separator

The thickness of the battery separator is preferably 6 to 30 μm in view of mechanical strength and battery capacity.

As for the width of the battery separator, the lower limit is preferably 100 mm, more preferably 500 mm, still more preferably 800 mm. The upper limit is not particularly specified but is preferably 3,000 mm, more preferably 2,000 mm, still more preferably 1,500 mm.

EXAMPLES

Our separators and methods are specifically described below by referring to Examples, but this disclosure is not limited by these Examples in any way. The measured values in Examples are a value measured by the following methods.

1. Measurement of Variation Range of F25 Value

A specimen of TD 10 mm×MD 50 mm was cut out at 5 positions equally spaced relative to the width direction of the polyolefin microporous membrane obtained in Examples and Comparative Examples. The specimen in both edge parts was cut out at a position of 30 to 40 mm from the edge part in the width direction of the microporous membrane. In conformity with JIS K7113, an SS curve (the relationship between normal stress (stress) and normal strain (strain)) in the machine direction of the specimen was determined using a tabletop precision universal tester (Autograph AGS-J, manufactured by Shimadzu Corporation). The normal stress value at 25% elongation of normal strain was read, and the value was divided by the cross-sectional area of each specimen. Three sheets of each specimen were measured for each measurement position, and the average thereof was defined as the F25 value at each measurement position. The variation range of the F25 value was determined from the difference between maximum value and minimum of the F25 value at each measurement position. A polyolefin microporous membrane obtained by peeling and removing the porous layer from the battery separator may be used for the specimen as well.

Measurement Conditions:
  Load cell capacity: 1 kN
  Clip-to-clip distance: 20 mm
  Test speed: 20 mm/min
  Measurement environment: temperature 20° C. and relative humidity 60%

2. Thickness Variation Range (R) in Width Direction of Porous Layer

A specimen of TD 10 mm×MD 50 mm was cut out at 5 positions equally spaced relative to the width direction of the battery separator obtained in Examples and Comparative Examples. The specimen in both edge parts was cut out at a position of 30 to 40 mm from the edge part in the width direction of the separator. The thickness of the porous layer was determined by SEM observation of the cross section of each specimen. The cross-sectional specimen was prepared using cryo CP method and after depositing a minute amount of fine metal particles to prevent charge-up of the electron beam, an SEM image was photographed and observed. The boundary line between the polyolefin microporous membrane and the porous layer was confirmed from the existence region of inorganic particles. Three sheets of each specimen were measured for each measurement position and taking an average value of thicknesses at a total of 15 points as the average thickness T(ave) of the porous layer, the difference between maximum value and minimum value thereof was determined from the average thickness of the porous layer at each measurement position and defined as the thickness variation range (R) of the porous layer relative to the width direction.

Measurement Instrument:
  Field emission scanning electron microscope (FE-SEM) S-4800, manufactured by Hitachi High-Technologies Corporation
  Cross section polisher (CP) SM-9010 (manufactured by JEOL Ltd.)
Measurement Conditions:
  Acceleration voltage: 1.0 kV 3. Viscosity of Coating Solution The viscosity of the coating solution was measured at 25° C. by using a viscometer (DV-I PRIME, manufactured by BROOKFIELD).

4. Transportability

The amount of lateral deviation of the polyolefin microporous membrane in the course of coating 1,000 m of the polyolefin microporous membrane at a transport rate of 50 m/min was read.

Criteria:
  A (good): less than 5 mm
  B (acceptable): 5 to 10 mm
  fC (fail): more than 10 mm 5. Evaluation of High-Density Winding The battery separator obtained in each of Examples and Comparative Examples was wound on a paper tube having an outer diameter of 96 mm and a wall thickness of 10 mm with a tension of 50 N/m until the wall thickness of the separator became 15 mm, and the winding length was measured. Assigning that an arbitrary paper tube surface position before winding was 0 mm, the wall thickness of the separator was detected by a laser sensor. The winding length of Comparative Example 1 was taken as 100, and the separator winding length of each of Examples and Comparative Examples was relatively compared. A larger value means that the high-density winding is excellent.

6. Winding Appearance

The roll of the battery separator obtained in each of Examples and Comparative Examples was observed with an eye, and the number of defects, i.e., gauge band and bulging or corrugation in the roll end part, was counted.

Criteria:
  A (good): None
  B (acceptable): 1 to 3 defects
  C (fail): 4 or more defects Example 1

Production of Polyolefin Microporous Membrane

A polyethylene composition was prepared by dry-blending 0.375 parts by mass of tetraki s [methylene-3-(3,5-ditertiary-butyl-4-hydroxyphenyl)-propionate]methane in 100 parts by mass of a composition composed of 40 mass % of an ultrahigh-molecular-weight polyethylene having a mass average molecular weight of $2.5 \times 10^6$ and 60 mass % of a high-density polyethylene having a mass average molecular weight of $2.8 \times 10^5$. 30 parts by weight of the obtained polyethylene composition was added into a twin-screw extruder. Furthermore, 70 parts by weight of liquid paraffin was supplied through the side feeder of the twin-screw extruder and melt-kneaded to prepare a polyethylene resin solution in the extruder. Subsequently, the polyethylene resin solution was extruded at 190° C. through the die disposed at the end of the extruder, and an unstretched gel-like sheet was formed while taking off the extrudate on a cooling roller in which the temperature of internal cooling water was kept at 25° C.

The unstretched gel-like sheet obtained was passed through a group of four preheat rollers such that the temperature of the sheet surface became 110° C., and then introduced into a longitudinal stretching device A illustrated in FIG. 1. For the longitudinal stretching roller, a metal roller (surface roughness: 0.5 S) having a width of 1,000 mm and a diameter of 300 mm, which had been subjected to hard chromium plating, was used. The surface temperature of each longitudinal stretching roller was 110° C., and the temperature variation range in each roller was within ±2° C. For the doctor blade, a polyester-made doctor blade was used. A nitrile rubber-coated roller (manufacture by Katsura Roller Mfg. Co., Ltd.) was used for the nip roller, and the pressure of each nip roller was set to 0.3 MPa. The gel-like sheet was stretched to 7 times in the longitudinal direction by setting a peripheral speed ratio among respective rollers such that the rotation speed of each stretching roller of the longitudinal stretching device A becomes faster as it goes downstream. Subsequently, the sheet was passed through 4 cooling rollers, and the sheet temperature was thereby cooled to 50° C. to form a longitudinally stretched gel-like sheet.

The longitudinally stretched gel-like sheet obtained was held by a clip at both edge parts and stretched to 6 times in the transverse direction at a temperature of 115° C. in a tenter divided into 20 zones to form a biaxially stretched gel-like sheet. At this time, from inlet to outlet of the tenter, the clip-to-clip distance in the sheet traveling direction was set to 5 mm. In addition, the variation range of the wind speed in the width direction of hot air inside the tenter was adjusted to 3 m/sec or less.

The biaxially stretched gel-like sheet obtained was cooled to 30° C. and after removing the liquid paraffin in a temperature-conditioned methylene chloride washing bath at 25° C., dried in a drying oven controlled at 60° C.

Figure 4:
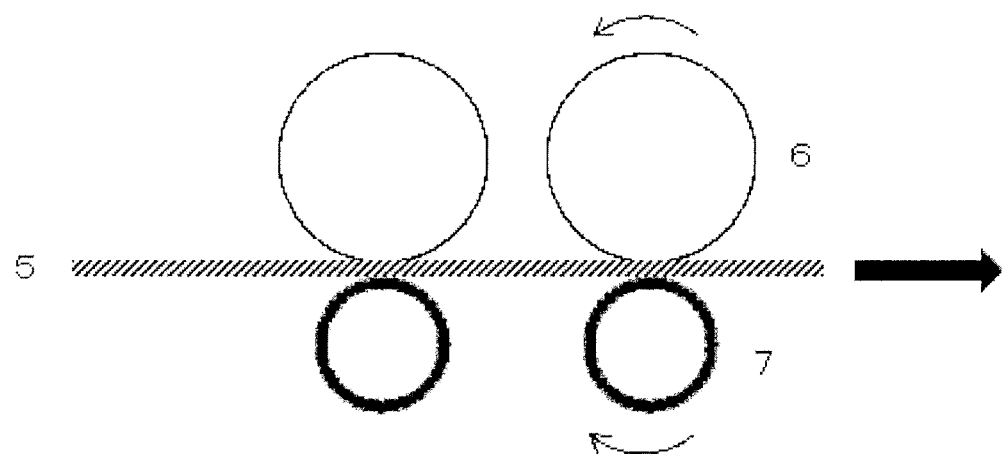
FIG. 4 is a schematic diagram illustrating an example of a longitudinal stretching device used in the re-stretching step.

The obtained sheet after drying was re-stretched to give a longitudinal stretch ratio of 1.2 times in a re-stretching device illustrated in FIG. 4 and heat-treated at 125° C. for 20 seconds to obtain a polyolefin microporous membrane having a width of 2,000 mm and a thickness of 7 μm. The polyolefin microporous membrane was wound up at a transport rate of 50 m/min during winding to obtain a polyolefin microporous membrane roll having a width of 2,000 mm and a winding length of 5,050 m. The polyolefin microporous membrane was unwound from the obtained roll and processed by slitting to have a width of 950 mm, and the resulting polyolefin microporous membrane was used as a coating substrate.

Preparation of Coating Solution

A polyvinylidene fluoride-hexafluoropropylene copolymer (VdF/HFP=92/8 (weight ratio), weight average molecular weight: 1,000,000) and a polyvinylidene fluoride-hexafluoropropylene copolymer (VdF/HFP=88/12 (weight ratio), weight average molecular weight: 600,000) were blended as fluorine-based resins such that the solution viscosity of the coating solution became 100 mPa·s.

In the coating solution, fluorine-based resins, an alumina particle (average particle diameter: 0.5 μm) as an inorganic particle, and N-methyl-2-pyrrolidone were blended, the alumina particle was contained in a ratio of 50 vol % relative to the total volume of the fluorine-based resins and the alumina particle, and the solid content concentration set to 10 wt %. After the fluorine-based resin component was completely dissolved and the alumina particle uniformly dispersed, the resulting dispersion was filtered through a filter with a filtration limit of 5 μm to prepare Coating Solution a.

Coating Solution a was applied in the same amount onto both surfaces of the coating substrate under the condition of a transport rate of 50 m/min by using a coating device (reverse gravure coating method) illustrated in FIG. 5 and coagulated by immersing it in a coagulation bath composed of an aqueous solution containing 5 wt % of N-methyl-2-pyrrolidone, followed by water washing and drying, thereby obtaining a battery separator. At this time, the positions of gravure roller and backing roller of the coating device were adjusted such that the coating contact line had a width of 3 to 5 mm.

Subsequently, the battery separator was processed by slitting to have an effective coating width to obtain a battery separator roll having a width of 900 mm and a winding length of 5,000 m. The dry weight of the porous layer was 5.0 g/m$^2$ in total of both surfaces.

Example 2

Figure 2:
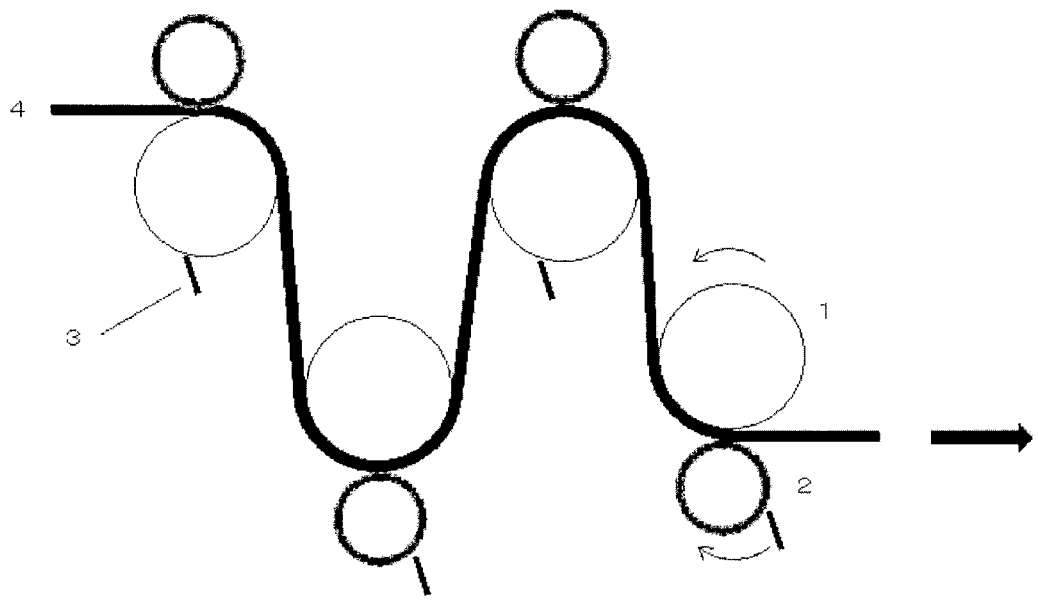
FIG. 2 is a schematic diagram illustrating a longitudinal stretching device B used for sequential biaxial stretching.

A battery separator was obtained in the same manner as in Example 1 except that a longitudinal stretching device B illustrated in FIG. 2 was used in place of the longitudinal stretching device A.

Example 3

Figure 3:
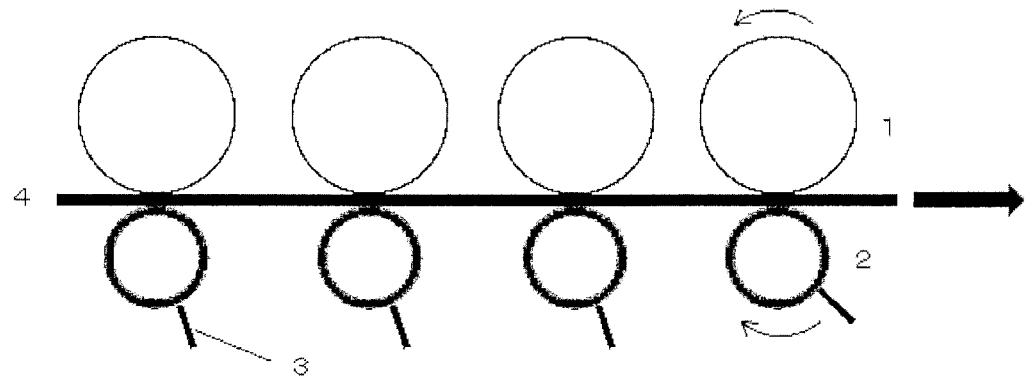
FIG. 3 is a schematic diagram illustrating a longitudinal stretching device C used for sequential biaxial stretching.

A battery separator was obtained in the same manner as in Example 1 except that a longitudinal stretching device C illustrated in FIG. 3 was used in place of the longitudinal stretching device A.

Example 4

A battery separator was obtained in the same manner as in Example 1 except that in the longitudinal stretching device A, the pressure of each nip roller was set to 0.1 MPa.

Example 5

A battery separator was obtained in the same manner as in Example 1 except that in the longitudinal stretching device A, the pressure of each nip roller was set to 0.5 MPa.

Example 6

A battery separator was obtained in the same manner as in Example 1 except that in the longitudinal stretching device A, a ceramic-coated metal roller having a surface roughness of 5 S was used for all of the four longitudinal stretching rollers.

Example 7

A battery separator was obtained in the same manner as in Example 1 except that Coating Solution b prepared by adjusting the blending ratio of the fluorine-based resin of Example 1 to have the solution viscosity of the coating solution to 70 mPa·s was used.

Example 8

A battery separator was obtained in the same manner as in Example 1 except that Coating Solution c prepared by adjusting the blending ratio of the fluorine-based resin of Example 1 to have the solution viscosity of the coating solution to 180 mPa·s was used.

Example 9

A battery separator was obtained in the same manner as in Example 1 except that Coating Solution d obtained by using an alumina particle (average particle diameter: 1.5 μm) as the inorganic particle in the preparation of the coating solution was used.

Example 10

A battery separator was obtained in the same manner as in Example 1 except that Coating Solution e obtained by blending the alumina particle to account for 70 vol % relative to the total volume of the fluorine-based resin and the alumina particle and adjusting the blending ratio of the fluorine-based resin of Example 1 to have a solution viscosity of 100 mPa·s was used.

Comparative Example 1

Production of Polyolefin Microporous Membrane

The unstretched gel-like sheet obtained in Example 1 was held by clips at both edge parts, introduced into a tenter divided into 5 zones each conditioned to a temperature of 116° C., and stretched by a simultaneous biaxial stretching method to 7 times in the longitudinal direction and to 7 times in the transverse direction to form a simultaneously biaxially stretched gel-like sheet. At this time, the clip-to-clip distance was 5 mm at the tenter inlet relative to the sheet traveling direction and was 95 mm at the tenter outlet. In addition, the variation range of the wind speed in the width direction of hot air inside the tenter was 4 m/sec to 7 m/sec. Subsequently, the simultaneously biaxially stretched gel-like sheet was cooled to 30° C. and washed in a temperature-conditioned methylene chloride washing bath at 25° C. to remove the liquid paraffin, and the resulting sheet dried in a drying oven controlled at 60° C. to obtain a polyolefin microporous membrane having a width of 2,000 mm and a thickness of 7 μm. The polyolefin microporous membrane was wound up at a transport rate of 50 m/min during winding to obtain a polyolefin microporous membrane roll having a width of 2,000 mm and a winding length of 5,050 m. The polyolefin microporous membrane was unwound from the obtained roll and processed by slitting to have a width of 950 mm, and the resulting polyolefin microporous membrane used as a coating substrate. A battery separator was obtained in the same manner as in Example 1 by using the coating substrate obtained above.

Comparative Example 2

A battery separator was obtained in the same manner as in Example 1 except that in the longitudinal stretching device A, any nip roller was not used with respect to all the four stretching rollers.

Comparative Example 3

A battery separator was obtained in the same manner as in Example 1 except that a longitudinal stretching device B was used as the longitudinal stretching device and any nip roller was not used with respect to all the four stretching rollers.

Comparative Example 4

A battery separator was obtained in the same manner as in Example 1 except that in the longitudinal stretching device A, the pressure of each nip roller was set to 0.04 MPa.

Comparative Example 5

A battery separator was obtained in the same manner as in Example 1 except that in the longitudinal stretching device A, a hard chromium-plated metal roller having a surface roughness of 0.1 S was used for the longitudinal stretching roller.

Comparative Example 6

A battery separator was obtained in the same manner as in Example 1 except that in the longitudinal stretching device A, the temperature variation range in each longitudinal stretching roller was within ±5° C.

Comparative Example 7

A battery separator was obtained in the same manner as in Example 1 except that a Mayer bar was used as the coating method and the porous layer was applied to give a dry weight of 5.0 g/m² in total of both surfaces.

Comparative Example 8

A battery separator was obtained in the same manner as in Example 1 except that Coating Solution f obtained by adjusting the blending ratio of the fluorine-based resin of Example 1 to have a solution viscosity of 650 Pa·s was used.

Comparative Example 9

A polyethylene porous membrane having the same thickness as the battery separator of Example 1, obtained by adjusting the extrusion amount of the polyethylene resin solution in the production process of the polyolefin microporous membrane of Example 1, was used as the battery separator.

The production conditions of the polyolefin microporous membranes of Examples 1 to 10 and Comparative Examples 1 to 9 and the variation range of the F25 value (MPa) of the polyolefin microporous membranes are shown in Table 1, and the coating conditions and properties of the polyolefin microporous membranes and battery separators are shown in Table 2.

TABLE 1

| | | Production Conditions of Polyolefin Microporous Membrane | | | | | | Polyolefin Microporous |
| --- | --- | --- | --- | --- | --- | --- | --- | --- |
| | Stretching Method | Longitudinal Stretching Device | Surface Roughness of Longitudinal Stretching Roller (S) | Variation Range of Surface Temperature of Longitudinal Stretching Roller | Nip Pressure (MPa) | Variation Range of Wind Speed in Width Direction of Hot Air | Clip-to-Clip Distance at Tenter Outlet (mm) | Membrane Variation Range of F25 Value (MPa) |
| Example 1 | sequential biaxial | A | 0.5 | within ±2° C. | 0.3 | 3 m/sec or less | 5 | 0.7 |
| Example 2 | sequential biaxial | B | 0.5 | within ±2° C. | 0.3 | 3 m/sec or less | 5 | 0.6 |
| Example 3 | sequential biaxial | C | 0.5 | within ±2° C. | 0.3 | 3 m/sec or less | 5 | 0.8 |

TABLE 1-continued

| | Production Conditions of Polyolefin Microporous Membrane | | | | | | | Polyolefin Microporous Membrane Variation Range of F25 Value (MPa) |
|---|---|---|---|---|---|---|---|---|
| | Stretching Method | Longitudinal Stretching Device | Surface Roughness of Longitudinal Stretching Roller (S) | Variation Range of Surface Temperature of Longitudinal Stretching Roller | Nip Pressure (MPa) | Variation Range of Wind Speed in Width Direction of Hot Air | Clip-to-Clip Distance at Tenter Outlet (mm) | |
| Example 4 | sequential biaxial | A | 0.5 | within ±2° C. | 0.1 | 3 m/sec or less | 5 | 0.5 |
| Example 5 | sequential biaxial | A | 0.5 | within ±2° C. | 0.5 | 3 m/sec or less | 5 | 1.0 |
| Example 6 | sequential biaxial | A | 5 | within ±2° C. | 0.3 | 3 m/sec or less | 5 | 0.5 |
| Example 7 | sequential biaxial | A | 0.5 | within ±2° C. | 0.3 | 3 m/sec or less | 5 | 0.7 |
| Example 8 | sequential biaxial | A | 0.5 | within ±2° C. | 0.3 | 3 m/sec or less | 5 | 0.7 |
| Example 9 | sequential biaxial | A | 0.5 | within ±2° C. | 0.3 | 3 m/sec or less | 5 | 0.7 |
| Example 10 | sequential biaxial | A | 0.5 | within ±2° C. | 0.3 | 3 m/sec or less | 5 | 0.7 |
| Comparative Example 1 | simultaneous biaxial | — | — | — | — | 4 to 7 m/sec | 95 | 3.5 |
| Comparative Example 2 | sequential biaxial | A | 0.5 | within ±2° C. | — | 3 m/sec or less | 5 | 2 |
| Comparative Example 3 | sequential biaxial | B | 0.5 | within ±2° C. | — | 3 m/sec or less | 5 | 1.8 |
| Comparative Example 4 | sequential biaxial | A | 0.5 | within ±2° C. | 0.04 | 3 m/sec or less | 5 | 1.6 |
| Comparative Example 5 | sequential biaxial | A | 0.1 | within ±2° C. | 0.3 | 3 m/sec or less | 5 | 1.3 |
| Comparative Example 6 | sequential biaxial | A | 0.5 | within ±5° C. | 0.3 | 3 m/sec or less | 5 | 1.4 |
| Comparative Example 7 | sequential biaxial | A | 0.5 | within ±2° C. | 0.3 | 3 m/sec or less | 5 | 0.7 |
| Comparative Example 8 | sequential biaxial | A | 0.5 | within ±2° C. | 0.3 | 3 m/sec or less | 5 | 0.7 |
| Comparative Example 9 | sequential biaxial | A | 0.5 | within ±2° C. | 0.3 | 3 m/sec or less | 5 | 0.7 |

TABLE 2

| | Coating Conditions Coating Solution | Polyolefin Microporous Membrane Transportability | Battery Separator | | |
|---|---|---|---|---|---|
| | | | Thickness Variation Range in Width Direction of Porous Layer (μm) | High-Density Winding | Winding Appearance |
| Example 1 | a | A | 0.5 | 106 | A |
| Example 2 | a | A | 0.4 | 107 | A |
| Example 3 | a | A | 0.6 | 105 | A |
| Example 4 | a | A | 0.3 | 107 | A |
| Example 5 | a | A | 0.8 | 104 | A |
| Example 6 | a | A | 0.4 | 108 | A |
| Example 7 | b | A | 0.5 | 111 | A |
| Example 8 | c | A | 0.5 | 104 | A |
| Example 9 | d | A | 0.5 | 106 | A |
| Example 10 | e | A | 0.5 | 106 | A |
| Comparative Example 1 | a | C | 1.9 | 100 | B |
| Comparative Example 2 | a | B | 1.7 | 101 | B |
| Comparative Example 3 | a | B | 1.6 | 101 | B |
| Comparative Example 4 | a | B | 1.5 | 102 | B |
| Comparative Example 5 | a | B | 1.1 | 102 | B |
| Comparative Example 6 | a | B | 1.7 | 101 | B |
| Comparative Example 7 | a | A | 1.8 | 95 | A |
| Comparative Example 8 | f | A | 0.5 | 94 | A |
| Comparative Example 9 | — | A | — | 107 | A |

The invention claimed is:

1. A battery separator comprising a polyolefin microporous membrane having a width of 100 mm or more, and a porous layer laminated on at least one surface of the polyolefin microporous membrane, wherein the polyolefin microporous membrane has a variation range of an F25 value in a width direction of 1 MPa or less (wherein the F25 value indicates a value obtained by dividing a load value measured at 25% elongation of a specimen with use of a tensile tester by a cross-sectional area of the specimen), and the porous layer contains a fluorine-based resin and an inorganic particle.

2. The battery separator according to claim 1, wherein the porous layer has a thickness variation range (R) in a width direction of 1.0 μm or less.

3. The battery separator according to claim 2, wherein the fluorine-based resin contains at least one member selected from a polyvinylidene fluoride and a polyvinylidene fluoride-hexafluoropropylene copolymer.

4. The battery separator according to claim 2, wherein a width of the battery separator is 500 mm or more.

5. A battery separator roll of the battery separator according to claim 2, wherein a length of the battery separator is 500 m or more.

6. The battery separator according to claim 1, wherein the fluorine-based resin contains at least one member selected from a polyvinylidene fluoride and a polyvinylidene fluoride-hexafluoropropylene copolymer.

7. The battery separator according to claim 6, wherein a width of the battery separator is 500 mm or more.

8. A battery separator roll of the battery separator according to claim 6, wherein a length of the battery separator is 500 m or more.

9. The battery separator according to claim 1, wherein a width of the battery separator is 500 mm or more.

10. A battery separator roll of the battery separator according to claim 9, wherein a length of the battery separator is 500 m or more.

11. A battery separator roll of the battery separator according to claim 1, wherein a length of the battery separator is 500 m or more.

12. A method of producing the battery separator according to claim 1, the method comprising steps (a) to (g) in the following order:
   (a) a step of melt-kneading a polyolefin resin and a forming solvent, thereby preparing a polyolefin resin solution;
   (b) a step of extruding the polyolefin resin solution into a sheet shape via an extruder and cooling an extrudate thereof, thereby forming an unstretched gel-like sheet;
   (c) a step of passing the unstretched gel-like sheet between at least two pairs of longitudinal stretching roller groups and stretching the sheet in a longitudinal direction based on a peripheral speed ratio of the two pairs of roller groups, thereby forming a longitudinally stretched gel-like sheet, wherein a longitudinal stretching roller and a nip roller parallelly contacting therewith are designated as a pair of longitudinal stretching roller group, and a contact pressure of the nip roller to the longitudinal stretching roller is 0.05 MPa or more and 0.5 MPa or less;
   (d) a step of stretching the longitudinally stretched gel-like sheet in a transverse direction while holding the sheet to allow a clip-to-clip distance to be 50 mm or less at a tenter outlet, thereby obtaining a biaxially stretched gel-like sheet;
   (e) a step of extracting the forming solvent from the biaxially stretched gel-like sheet and drying the sheet;
   (f) a step of heat-treating the dried sheet, thereby obtaining a polyolefin microporous membrane; and
   (g) a step of coating the polyolefin microporous membrane with a coating solution containing a fluorine-based resin and an inorganic particle by a reverse gravure coating method, passing the membrane through a coagulation bath, and then, subjecting to water washing and drying, thereby laminating a porous layer on the polyolefin microporous membrane.

13. The method according to claim 12, wherein the coating solution has a solution viscosity of 50 to 200 mPa·s.

14. A method of producing the battery separator according to claim 2, the method comprising steps (a) to (g) in the following order:
   (a) a step of melt-kneading a polyolefin resin and a forming solvent, thereby preparing a polyolefin resin solution;
   (b) a step of extruding the polyolefin resin solution into a sheet shape via an extruder and cooling an extrudate thereof, thereby forming an unstretched gel-like sheet;
   (c) a step of passing the unstretched gel-like sheet between at least two pairs of longitudinal stretching roller groups and stretching the sheet in a longitudinal direction based on a peripheral speed ratio of the two pairs of roller groups, thereby forming a longitudinally stretched gel-like sheet, wherein a longitudinal stretching roller and a nip roller parallelly contacting therewith are designated as a pair of longitudinal stretching roller group, and a contact pressure of the nip roller to the longitudinal stretching roller is 0.05 MPa or more and 0.5 MPa or less;
   (d) a step of stretching the longitudinally stretched gel-like sheet in a transverse direction while holding the sheet to allow a clip-to-clip distance to be 50 mm or less at a tenter outlet, thereby obtaining a biaxially stretched gel-like sheet;
   (e) a step of extracting the forming solvent from the biaxially stretched gel-like sheet and drying the sheet;
   (f) a step of heat-treating the dried sheet, thereby obtaining a polyolefin microporous membrane; and
   (g) a step of coating the polyolefin microporous membrane with a coating solution containing a fluorine-based resin and an inorganic particle by a reverse gravure coating method, passing the membrane through a coagulation bath, and then, subjecting to water washing and drying, thereby laminating a porous layer on the polyolefin microporous membrane.

15. A method of producing the battery separator according to claim 6, the method comprising steps (a) to (g) in the following order:
   (a) a step of melt-kneading a polyolefin resin and a forming solvent, thereby preparing a polyolefin resin solution;
   (b) a step of extruding the polyolefin resin solution into a sheet shape via an extruder and cooling an extrudate thereof, thereby forming an unstretched gel-like sheet;
   (c) a step of passing the unstretched gel-like sheet between at least two pairs of longitudinal stretching roller groups and stretching the sheet in a longitudinal direction based on a peripheral speed ratio of the two pairs of roller groups, thereby forming a longitudinally stretched gel-like sheet, wherein a longitudinal stretching roller and a nip roller parallelly contacting therewith are designated as a pair of longitudinal stretching roller group, and a contact pressure of the nip roller to the longitudinal stretching roller is 0.05 MPa or more and 0.5 MPa or less;
   (d) a step of stretching the longitudinally stretched gel-like sheet in a transverse direction while holding the sheet to allow a clip-to-clip distance to be 50 mm or less at a tenter outlet, thereby obtaining a biaxially stretched gel-like sheet;
   (e) a step of extracting the forming solvent from the biaxially stretched gel-like sheet and drying the sheet;
   (f) a step of heat-treating the dried sheet, thereby obtaining a polyolefin microporous membrane; and
   (g) a step of coating the polyolefin microporous membrane with a coating solution containing a fluorine-based resin and an inorganic particle by a reverse gravure coating method, passing the membrane through a coagulation bath, and then, subjecting to water washing and drying, thereby laminating a porous layer on the polyolefin microporous membrane.

16. A method of producing the battery separator according to claim 9, the method comprising steps (a) to (g) in the following order:
   (a) a step of melt-kneading a polyolefin resin and a forming solvent, thereby preparing a polyolefin resin solution;

(b) a step of extruding the polyolefin resin solution into a sheet shape via an extruder and cooling an extrudate thereof, thereby forming an unstretched gel-like sheet;

(c) a step of passing the unstretched gel-like sheet between at least two pairs of longitudinal stretching roller groups and stretching the sheet in a longitudinal direction based on a peripheral speed ratio of the two pairs of roller groups, thereby forming a longitudinally stretched gel-like sheet, wherein a longitudinal stretching roller and a nip roller parallelly contacting therewith are designated as a pair of longitudinal stretching roller group, and a contact pressure of the nip roller to the longitudinal stretching roller is 0.05 MPa or more and 0.5 MPa or less;

(d) a step of stretching the longitudinally stretched gel-like sheet in a transverse direction while holding the sheet to allow a clip-to-clip distance to be 50 mm or less at a tenter outlet, thereby obtaining a biaxially stretched gel-like sheet;

(e) a step of extracting the forming solvent from the biaxially stretched gel-like sheet and drying the sheet;

(f) a step of heat-treating the dried sheet, thereby obtaining a polyolefin microporous membrane; and (g) a step of coating the polyolefin microporous membrane with a coating solution containing a fluorine-based resin and an inorganic particle by a reverse gravure coating method, passing the membrane through a coagulation bath, and then, subjecting to water washing and drying, thereby laminating a porous layer on the polyolefin microporous membrane.

* * * * *